G. A. KRAUSE.
METHOD OF VAPORIZING OR CONCENTRATING LIQUIDS, SOLUTIONS, EMULSIONS, SUSPENSIONS, AND LIKE SUBSTANCES.
APPLICATION FILED NOV. 29, 1916.
1,213,887.
Patented Jan. 30, 1917.
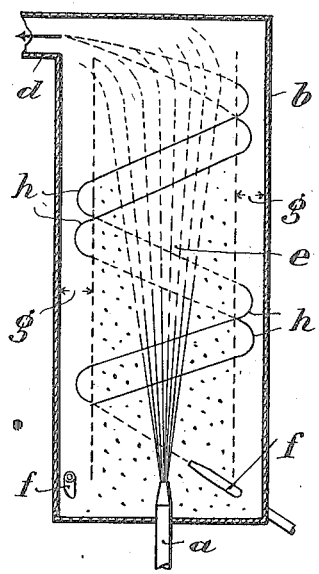
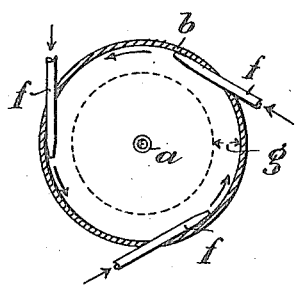
Inventor
Georg A. Krause
by [signature]
his Attorney

UNITED STATES PATENT OFFICE.

GEORG A. KRAUSE, OF MUNICH, GERMANY.

METHOD OF VAPORIZING OR CONCENTRATING LIQUIDS, SOLUTIONS, EMULSIONS, SUSPENSIONS, AND LIKE SUBSTANCES.

1,213,887.     Specification of Letters Patent.     Patented Jan. 30, 1917.

Application filed November 29, 1916. Serial No. 134,042.

*To all whom it may concern:*

Be it known that I, GEORG A. KRAUSE, citizen of Germany, residing at Munich, Bavaria, Germany, have invented certain new and useful Improvements in Methods of Vaporizing or Concentrating Liquids, Solutions, Emulsions, Suspensions, and Like Substances; and I do hereby declare the following to be a full, clear, and exact description of the invention, such as will enable others skilled in the art to which it appertains to make and use the same.

It has been heretofore proposed to obtain the solid bodies, contained in certain liquids, such, for instance, as blood or milk, by atomizing the said liquid within a receptacle containing hot air. This method is defective because very large receptacles filled with hot air are required for treating a comparatively small amount of liquid if a sufficiently dry final product is to be obtained. Another disadvantage is that the drying action is more effective near those places where the heating of the receptacle walls takes place, than in the center part of the receptacle, whereby unequal drying of the final product results. Another disadvantage is that a part of the solid bodies separated out adheres to the walls of the receptacle and forms a layer, which not only detrimentally affects the walls, but also the efficiency of the process and the product sought to be attained.

For the same purpose devices have been used, in which the liquid, from which the solid bodies are to be separated out, is atomized in a chamber, in which hot air rises from the bottom to the top in a closed current filling the whole chamber and traversing the obliquely upwardly directed liquid particles.

Devices of the kind last mentioned require a drying chamber disproportionately large as compared with the quantity of liquid to be treated because owing to the oblique direction of travel of the liquid, particles of the latter remain partly untreated and partly insufficiently treated. Further, in these devices the great disadvantage has been experienced that the walls of the drying chamber are covered with bodies to be dried, which form a kind of incrustation. The tendency of the particles to settle on the walls of the drying chamber is increased because the solid bodies to be separated out are forced into the chamber in an oblique direction and are carried with a gradually diminishing speed against the walls of the drying chamber.

In an effort to prevent the walls of the receptacle or drying chamber from becoming coated, processes have been proposed according to which the atomization of the liquid is effected within a moving envelop of air. In accordance with one of these processes the air envelop is moved in spiral lines opposite to the direction of motion of the substances to be atomized. This process, however, is not free from disadvantages because owing to the opposite direction of motion the air envelop alone is not sufficient to effect the desired drying. To effect such drying, an additional air current is necessary, which flows in the same direction as the liquid.

Another disadvantage is that the dry parts of the product come in contact with those parts which are still wet, and therefore in this process uniform progressive drying is not effected.

Finally, a process has become known, in which the substances to be treated are sprayed into the receptacle lengthwise of the same, and the air, gas, or steam is successively fed into the receptacle in the same direction, so that the substances to be treated and the air, gas, or steam travel in the same general direction. This process has the disadvantage that a great part of the drying medium remains ineffective and is not made use of because on the one hand the distance traveled by the same within the drying chamber, is proportionately short, and on the other hand during the passage of the substance to be treated in a straight line a great part of the substance remains in the outer part of the air gas or steam envelop and as a consequence does not come in contact with the atomizing liquid and is practically lost.

Now, according to the present invention the heated drying medium is blown in a direction from the bottom to the top of the receptacle in such a manner that it is moved around the atomized liquid in a sinuous or screw-like path. In this manner the great advantage is obtained over the processes referred to above that the heated air gas or steam envelop is forced to move around the atomized liquid to a much greater extent than heretofore. It is obvious that thus a greater mechanical division of the fine vapor parts is caused and the drying effected quicker and more effectively. Moreover, because of the sinuous motion of the drying medium the latter is more effectively mixed, as the air gas or steam particles on the outside of the air gas or steam envelop are forced to the inside thereof and thus come into intimate contact with the vapor, whereby the drying medium is more advantageously and economically availed of.

The process is preferably carried out in an apparatus which is shown in the accompanying drawing.

Figure 1 is a side view and Fig. 2 a section through the bottom of the apparatus.

$b$ is a vertical cylindrical receptacle and $a$ a nozzle in the bottom of the same, through which the liquid to be treated is forced under a certain pressure into the said receptacle $b$.

$f$ are nozzles for blowing in heated air gas or steam. These nozzles $f$ are tangentially or nearly tangentially arranged in relation to the wall of the cylinder $b$ or to a surface concentric to the wall of the cylinder, in such a manner that the mouths of the nozzles $f$ are more or less inclined upwardly, all at the same or at different levels concentrically in relation to the mouth of the nozzle $a$. In this manner a constantly regenerating heated air gas or steam envelop is forced around the liquid current, the parts of the air gas or steam mantle being in an uninterrupted sinuous like movement. This movement is indicated by the lines $h$.

The receptacle may be of any desired shape and construction and may be a vertical or horizontal one. Likewise a number of such arrangements may be located in one apparatus, the air gas or steam, separating the different liquid vapors one from another so that a union of the vapors of the several clouds of liquid, which would cause the formation of drops, is obviated.

I claim as my invention:—

The herein described method of desiccating substances containing liquids, which consists in injecting said substances in a finely divided state into a desiccating chamber lengthwise thereof, and forcing an envelop of a heated gaseous drying medium in a sinuous path about said substance, the diameter of said envelop being maintained substantially uniform from one end of said desiccating chamber to the other.

In testimony whereof I hereunto affix my signature in the presence of two witnesses.

GEORG A. KRAUSE.

Witnesses:
W. S. SPIEGELBERG,
A. DIEHL.